United States Patent
Zhou et al.

(10) Patent No.: US 11,306,975 B2
(45) Date of Patent: Apr. 19, 2022

(54) VAPOR CHAMBER WATER-FILLING SECTION SEALING STRUCTURE

(71) Applicant: ASIA VITAL COMPONENTS CO., LTD., New Taipei (TW)

(72) Inventors: Xiao-Xiang Zhou, New Taipei (TW); Jian Zhang, New Taipei (TW); Han-Min Liu, New Taipei (TW)

(73) Assignee: ASIA VITAL COMPONENTS CO., LTD., New Taipei (TW)

( * ) Notice: Subject to any disclaimer, the term of this patent is extended or adjusted under 35 U.S.C. 154(b) by 0 days.

(21) Appl. No.: 16/550,318

(22) Filed: Aug. 26, 2019

(65) Prior Publication Data

US 2020/0056845 A1 Feb. 20, 2020

Related U.S. Application Data

(63) Continuation of application No. 15/921,662, filed on Mar. 15, 2018, now Pat. No. 10,591,222.

(51) Int. Cl.
*F28D 15/02* (2006.01)
*F28D 15/04* (2006.01)
*B23P 15/26* (2006.01)

(52) U.S. Cl.
CPC .......... *F28D 15/0283* (2013.01); *B23P 15/26* (2013.01); *F28D 15/0233* (2013.01); *F28D 15/04* (2013.01); *B23P 2700/09* (2013.01)

(58) Field of Classification Search
CPC .. B23P 2700/09; F28D 15/02; F28D 15/0233; F28D 15/0283; F28D 15/04; F28D 15/046; F28D 15/0241

(Continued)

(56) References Cited

U.S. PATENT DOCUMENTS

2005/0126769 A1* 6/2005 Pohlman ............... C22C 19/055
                                                              165/166
2011/0108245 A1* 5/2011 Tan ........................ F28D 15/04
                                                              165/104.26

(Continued)

FOREIGN PATENT DOCUMENTS

CN    101451791 A    6/2009
CN    201697515 U    1/2011

(Continued)

OTHER PUBLICATIONS

Search Report dated Dec. 17, 2018 issued by Taiwan Intellectual Property Office for counterpart application No. 107105374.

(Continued)

*Primary Examiner* — Frantz F Jules
*Assistant Examiner* — Jason N Thompson
(74) *Attorney, Agent, or Firm* — Demian K. Jackson; Jackson IPG PLLC

(57) ABSTRACT

A vapor chamber water-filling section sealing structure. The vapor chamber water-filling section sealing structure includes a main body and a capillary structure. The main body has a first plate body and a second plate body, which are correspondingly mated with each other to together define an airtight chamber and a water-filling section. A flange is disposed along an outer periphery of the main body. The water-filling section has a water-filling notch and a water-filling passage. Two ends of the water-filling passage are respectively connected with the flange and the water-filling notch to communicate with the airtight chamber. A portion of the water-filling passage that is connected with the flange is pressed to have a height equal to the height of the flange or lower than the height of the flange. The capillary structure is disposed in the airtight chamber of the main body.

4 Claims, 9 Drawing Sheets

(58) Field of Classification Search
USPC .................................................. 165/104.26
See application file for complete search history.

(56) References Cited

U.S. PATENT DOCUMENTS

| | | | | |
|---|---|---|---|---|
| 2011/0155350 | A1* | 6/2011 | Huang | F28D 15/0233 |
| | | | | 165/104.26 |
| 2012/0080170 | A1* | 4/2012 | Yang | F28D 15/0283 |
| | | | | 165/104.26 |
| 2012/0285662 | A1* | 11/2012 | Meyer, IV | F28D 15/04 |
| | | | | 165/104.26 |
| 2015/0119111 | A1* | 4/2015 | Honmura | H04M 1/026 |
| | | | | 455/566 |
| 2016/0128233 | A1* | 5/2016 | Lai | F28D 15/0233 |
| | | | | 165/104.26 |
| 2016/0221131 | A1* | 8/2016 | Shen | B23P 15/26 |
| 2017/0023308 | A1* | 1/2017 | Huang | F28D 15/0233 |
| 2017/0059254 | A1* | 3/2017 | Zhang | F28D 15/0233 |
| 2019/0029106 | A1* | 1/2019 | Lin | C25D 5/48 |

FOREIGN PATENT DOCUMENTS

| | | | |
|---|---|---|---|
| CN | 102131368 A | 7/2011 | |
| CN | 201992915 U | 9/2011 | |
| CN | 202014433 U | 10/2011 | |
| CN | 102956583 A | 3/2013 | |
| CN | 203432427 U | 2/2014 | |
| CN | 107231780 A | 10/2017 | |
| JP | 2000171182 A * | 6/2000 | ......... F28D 15/0233 |
| TW | I654152 B | 12/2018 | |

OTHER PUBLICATIONS

Search Report dated May 24, 2019 issued by China National Intellectual Property Administration for counterpart application No. 2018101554205.

Search Report dated Dec. 27, 2019 issued by China National Intellectual Property Administration for counterpart application No. 2018101554205.

* cited by examiner

VAPOR CHAMBER WATER-FILLING SECTION SEALING STRUCTURE

The present application is a continuation of U.S. patent application Ser. No. 15/921,662, filed on Mar. 15, 2018.

BACKGROUND OF THE INVENTION

1. Field of the Invention

The present invention relates generally to a vapor chamber water-filling section sealing structure, and more particularly to a vapor chamber water-filling section sealing structure, which can increase the vapor-liquid circulation space of the internal chamber and prevent the water-filling section protruding from the edge of the main body from being collided and damaged to fail.

2. Description of the Related Art

Currently, the vapor chamber is the most often seen heat dissipation structure body. The vapor chamber mainly provides large area face-to-face direct heat conduction, whereby the heat of one single heat source or multiple heat sources can be quickly conducted and dissipated. The heat conduction principle of the vapor chamber is substantially identical to that of the heat pipe. However, the vapor chamber is composed of two plate bodies, which are overlapped and mated with each other. The edges of the two plate bodies are then sealed to form a closed space. In addition, a water-filling tube is sandwiched and connected between the two plate bodies. The water-filling tube protrudes from the edges of the two plate bodies. Via the water-filling tube, the closed space is vacuumed and filled with water. Finally, the water-filling tube is sealed to achieve the vapor chamber.

Please refer to FIG. 1, which is a perspective view of a conventional vapor chamber. As shown in FIG. 1, in the manufacturing process of the vapor chamber 3, the closed space is vacuumed and filled with water via the water-filling tube 31. Finally, the tail end of the water-filling tube 31 is narrowed and sealed to avoid leakage of vacuum and the working fluid. The water-filling tube 31 of the conventional vapor chamber 3 protrudes from the edge of the vapor chamber 3. Therefore, during transfer, the water-filling tube 31 is apt to be collided and broken to cause leakage of the working fluid and the vacuum.

Please now refer to FIG. 2, which is a perspective view of another conventional vapor chamber. As shown in FIG. 2, the vapor chamber 3 is mainly composed of a first plate body 3a and a second plate body 3b, which are mated with each other by means of diffusion bonding to together define a closed chamber (not shown). A water-filling tube 31 is held between the first and second plate bodies 3a, 3b. In order to solve the above problem that the water-filling tube 31 protrudes from the edge of the vapor chamber 3, the vapor chamber 3 is further formed with an inward recessed notch 32 in which the water-filling tube 31 is disposed. Some manufacturers further dispose a protection structure 32 to up and down hold and protect the water-filling tube 31 from collision and damage. However, the protection structure 32 will hinder the sealing operation of the water-filling tube 31 to lead to inconvenience. In addition, the notch and the protection structure 32 will greatly reduce the range or capacity of the closed chamber of the vapor chamber 3. As a result, the heat conduction efficiency of the vapor chamber 3 is greatly lowered.

In addition to the above shortcomings, in the conventional vapor chamber structure as shown in FIGS. 1 and 2, a section is reversed for disposing the water-filling tube 31. Therefore, it is necessary to sacrifice some portions of the vapor chamber 3. This will reduce the area of the working portion of the vapor chamber 3. Therefore, it has become a critical topic how to eliminate the shortcomings of the conventional vapor chamber or even omit the water-filling tube 31.

SUMMARY OF THE INVENTION

It is therefore a primary object of the present invention to provide a vapor chamber water-filling section sealing structure, which can prevent the water-filling section protruding from the edge of the vapor chamber from being collided and damaged to fail.

To achieve the above and other objects, the vapor chamber water-filling section sealing structure of the present invention includes a main body and a capillary structure.

The main body has a first plate body and a second plate body. The first and second plate bodies are correspondingly mated with each other to together define an airtight chamber and a water-filling section. A flange is disposed along an outer periphery of the main body. The water-filling section has a water-filling notch and a water-filling passage. Two ends of the water-filling passage are respectively connected with the flange and the water-filling notch to communicate with the airtight chamber. A portion of the water-filling passage that is connected with the flange is pressed and sealed to have a height equal to the height of the flange or lower than the height of the flange. The capillary structure is disposed in the space of the airtight chamber of the main body.

The vapor chamber water-filling section sealing structure of the present invention can eliminate the shortcoming of the conventional vapor chamber that the water-filling section protrudes from the edge of the main body and is apt to be collided and damaged to fail. In addition, by means of the design of the water-filling section of the present invention, the area for sealing the edges is greatly increased to enhance the tightness of the sealed edge. Also, vapor-liquid circulation space and capacity of the internal chamber is increased to enhance the heat dissipation efficiency.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

Figure 1:
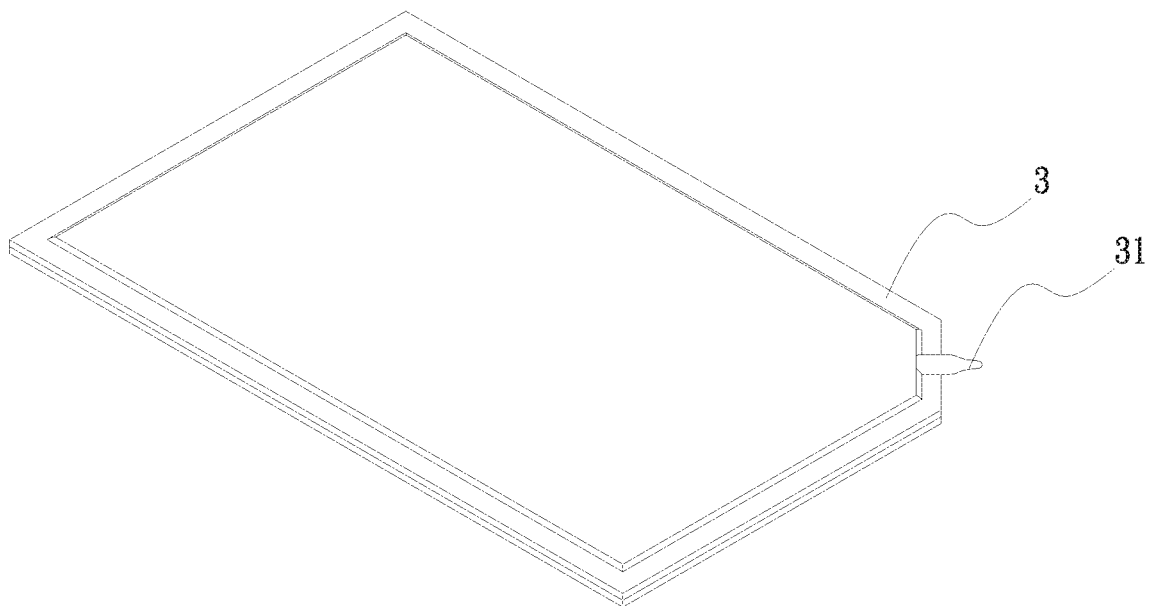
FIG. 1 is a perspective view of a conventional vapor chamber.
Figure 2:
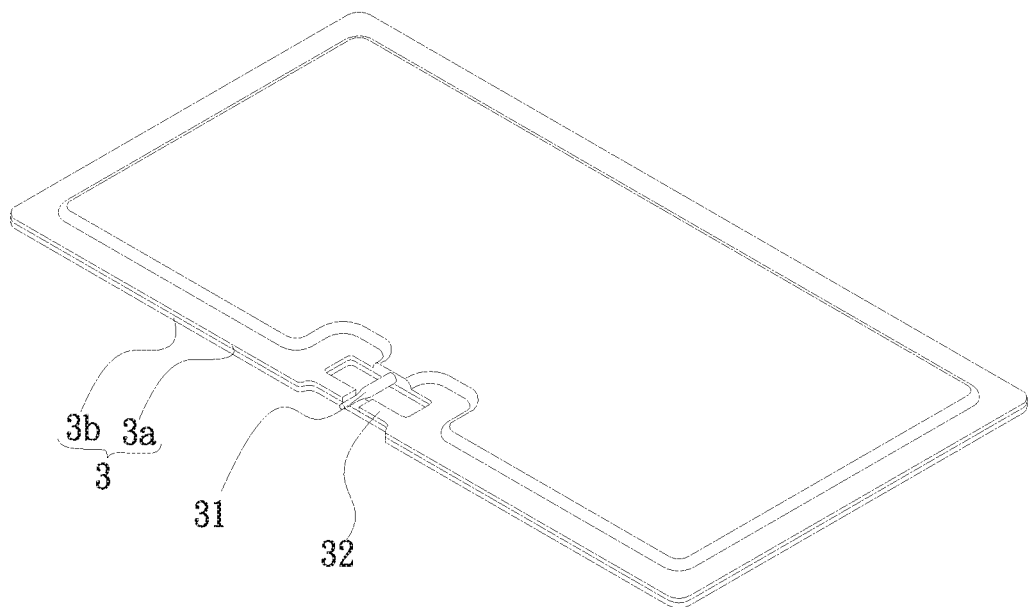
FIG. 2 is a perspective view of another conventional vapor chamber.
Figure 3:
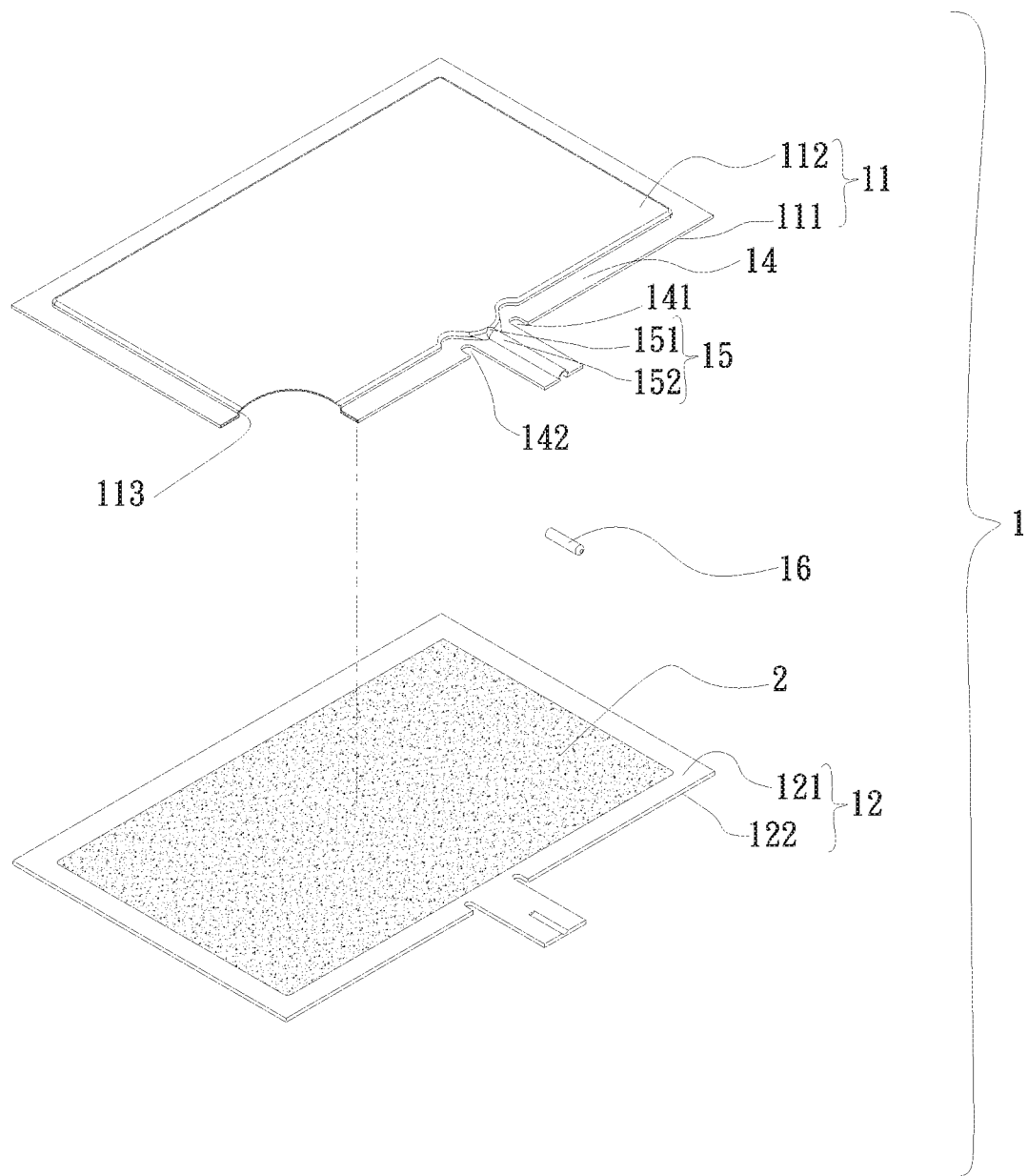
FIG. 3 is a perspective exploded view of a first embodiment of the vapor chamber water-filling section sealing structure of the present invention.
Figure 4:
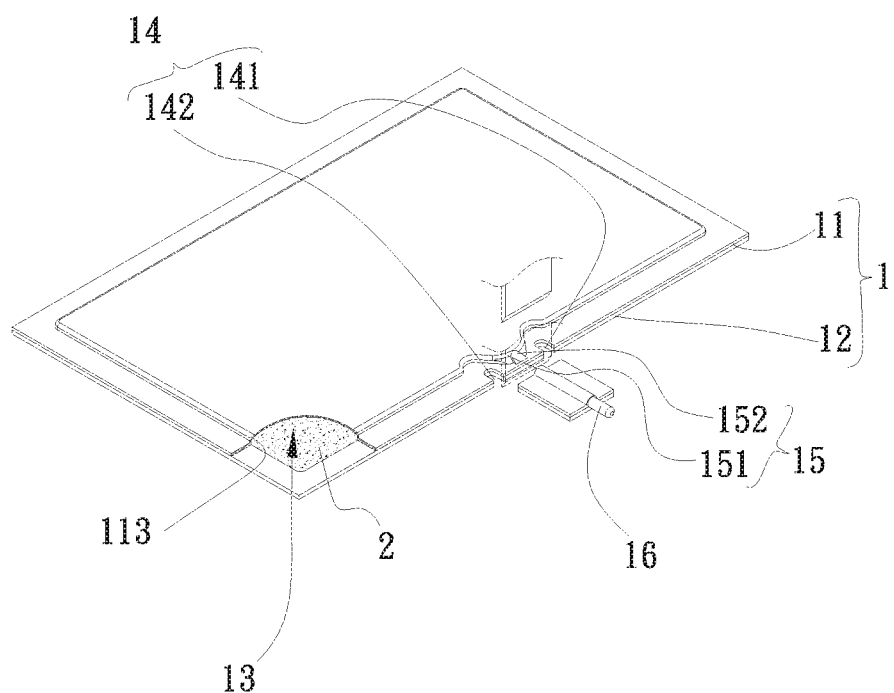
FIG. 4 is a perspective assembled view of the first embodiment of the vapor chamber water-filling section sealing structure of the present invention.

Please refer to FIGS. 3 and 4. FIG. 3 is a perspective exploded view of a first embodiment of the vapor chamber water-filling section sealing structure of the present invention. FIG. 4 is a perspective assembled view of the first embodiment of the vapor chamber water-filling section sealing structure of the present invention. According to the first embodiment, the vapor chamber water-filling section sealing structure of the present invention includes a main body 1 and a capillary structure 2.

The main body 1 has a first plate body 11 and a second plate body 12. The first and second plate bodies 11, 12 are correspondingly mated with each other to together define an airtight chamber 13 and a water-filling section 15. A flange 14 is disposed along an outer periphery of the main body 1, (that is, the flange 14 is disposed along the outer periphery of the first and second plate bodies 11, 12). The water-filling section 15 has a water-filling notch 151 and a water-filling passage 152. One end of the water-filling passage 152 extends to connect with the flange 14. The other end of the water-filling passage 152 connects with the airtight chamber 13 via the water-filling notch 151. A portion of the water-filling passage 152 that extends to connect with the flange 14 is pressed to have a height equal to the height of the flange 14 or lower than the height of the flange 14.

The first plate body 11 has a first face 111 and a second face 112. The second plate body 12 has a third face 121 and a fourth face 122. A depression 113 and the water-filling section 15 are raised from the first face 111 to the second face 112 of the first plate body 11. The third face 121 of the second plate body 12 is correspondingly mated with the depression 113 to form the airtight chamber 13. That is, the depression 113 and the water-filling section 15 (the water-filling notch 151 and the water-filling passage 152) are selectively raised from the second face 112 of the first plate body 11 or the fourth face 122 of the second plate body 12. In this embodiment, the depression 113 and the water-filling section 15 are, but not limited to, raised from the second face 112 of the first plate body 11 for illustration purposes. As aforesaid, the third face 121 of the second plate body 12 is correspondingly mated with the depression 113 to seal the open side of the depression 113 and the open side of the water-filling section 15. In addition, the flange 14 of the first and second plate bodies 11, 12 is sealed and connected by means of diffusion bonding. The second face 112 and the fourth face 122 are respectively disposed on the upper and lower faces of the main body 1. The second face 112 is defined as a condensation face, while the fourth face 122 is defined as a heat absorption face.

When sealing the water-filling passage 152, any part of the water-filling passage 152 is selectively pressed and flattened to have a height equal to the height of the flange 14 or lower than the height of the flange 14. In addition, the water-filling passage 152 can be cut to be flush with the flange 14 or slightly retracted into the flange 14. The flange 14 of the first and second plate bodies 11, 12 has a first notch 141 and a second notch 142 in a position where the water-filling notch 151 is positioned. In the case it is necessary to cut off the part of the water-filling section 15 that protrudes from the flange 14, the first and second notches 141, 142 serve to reduce the possibility of stress concentration.

The capillary structure 2 is selectively disposed on the first face 111 of the first plate body 11 or the third face 121 of the second plate body 12 or both the first face 111 of the first plate body 11 and the third face 121 of the second plate body 12. In this embodiment, the capillary structure 2 is, but not limited to, disposed on the third face 121 of the second plate body 12. The first and second plate bodies 11, 12 are made of a material selected from a group consisting of aluminum, copper, commercial pure titanium, aluminum alloy, copper alloy, ceramic, stainless steel and a combination thereof. The capillary structure 2 is selected from a group consisting of sintered powder, channeled body, mesh body, fiber body and whiskers.

Figure 5:
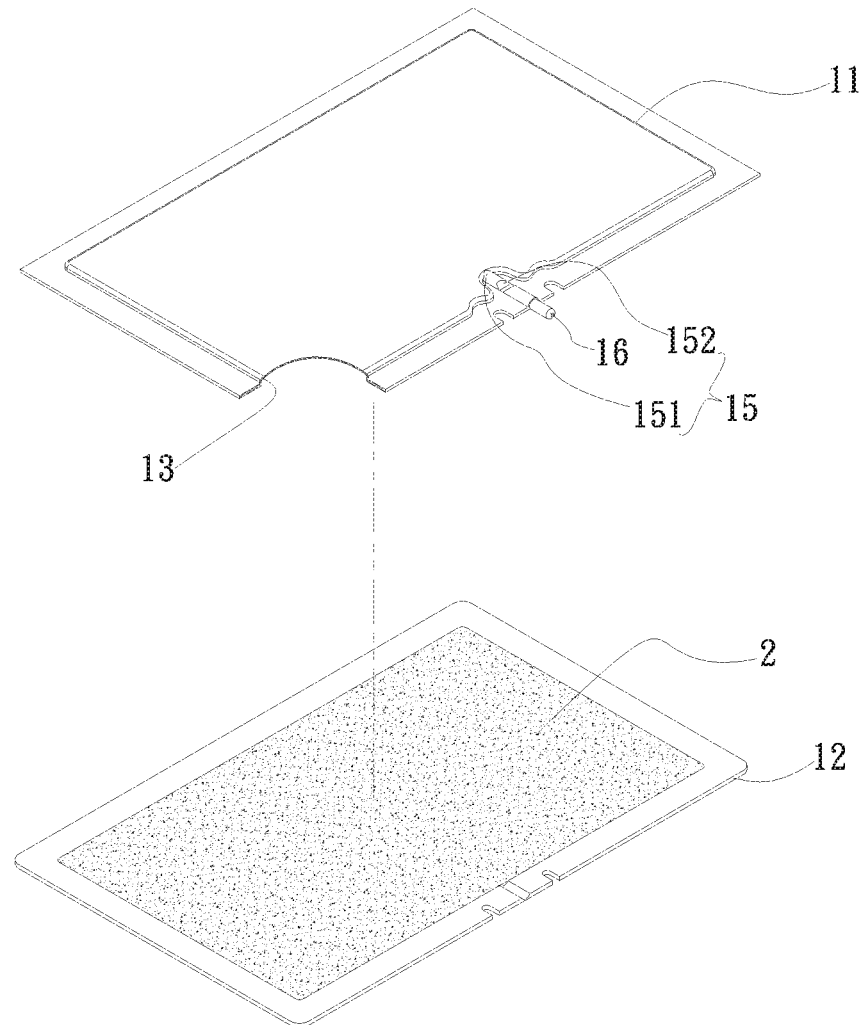
FIG. 5 is a perspective exploded view of a second embodiment of the vapor chamber water-filling section sealing structure of the present invention.
Figure 6:
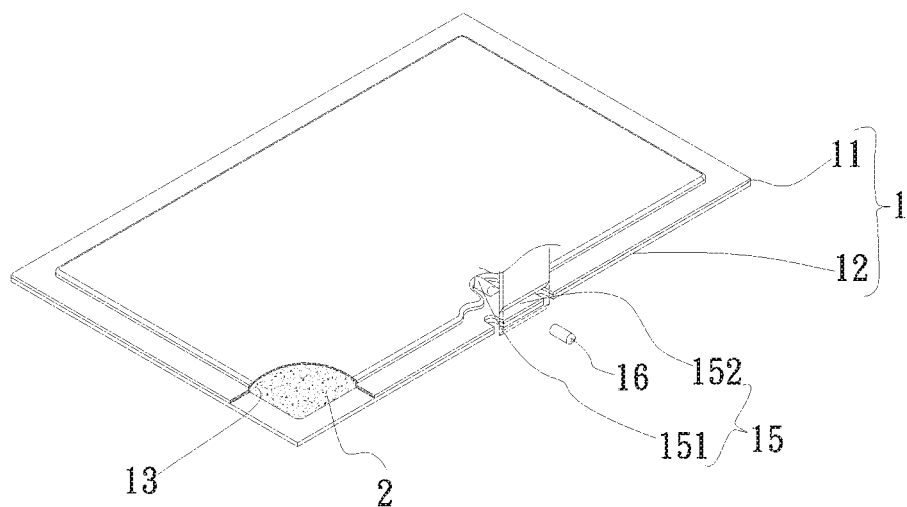
FIG. 6 is a perspective assembled view of the second embodiment of the vapor chamber water-filling section sealing structure of the present invention.

Please now refer to FIGS. 5 and 6. FIG. 5 is a perspective exploded view of a second embodiment of the vapor chamber water-filling section sealing structure of the present invention. FIG. 6 is a perspective assembled view of the second embodiment of the vapor chamber water-filling section sealing structure of the present invention. The second embodiment is partially identical to the first embodiment in structure and thus will not be repeatedly described hereinafter. The second embodiment is different from the first embodiment in that the water-filling notch 151 extends to the airtight chamber 13. One end of the water-filling notch 151 distal from the airtight chamber 13 extends to the water-filling passage 152. The water-filling passage 152 extends to the flange 14. When sealing the water-filling passage 152, any part of the water-filling passage 152 is selectively pressed and flattened to have a height equal to the height of the flange 14 or lower than the height of the flange 14.

Figure 7:
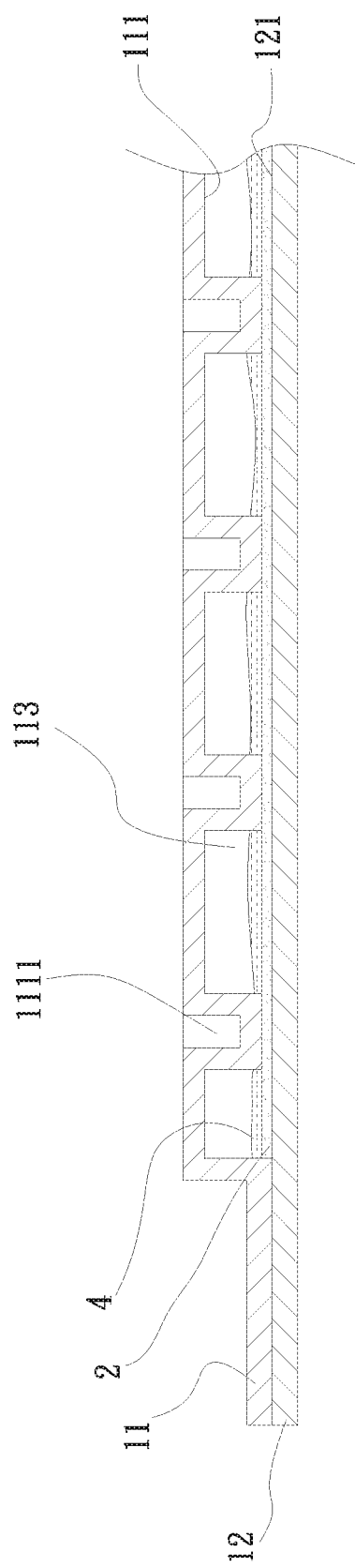
FIG. 7 is a sectional assembled view of a third embodiment of the vapor chamber water-filling section sealing structure of the present invention.

Please now refer to FIG. 7, which is a sectional assembled view of a third embodiment of the vapor chamber water-filling section sealing structure of the present invention. The third embodiment is partially identical to the first embodiment in structure and thus will not be repeatedly described hereinafter. The third embodiment is different from the first embodiment in that multiple pits 1111 are disposed on the first face 111 of the first plate body 11. The pits 1111 protrude and extend from the first face 111 to the depression 113 to abut against one face of the capillary structure 2. When the vapor-liquid circulation of the working fluid 4 in the main body 1 takes place, the pits 1111 serve to enhance the backflow of the condensed working fluid 4 and increase the supporting strength between the first and second plate bodies 11, 12. Alternatively, support columns (not shown) can be disposed between the first and second plate bodies 11, 12. Two ends of the support columns respectively abut against the first and third faces 111, 121. This structure also can increase the supporting strength between the first and second plate bodies 11, 12.

In addition, a coating can be disposed on the surfaces of the first and third faces 111, 121 and the capillary structure as a structure for enhancing the efficiency of the vapor-liquid circulation of the working fluid 4 in the main body 1. The coating can be a hydrophilic coating or a hydrophobic coating.

Figure 8:
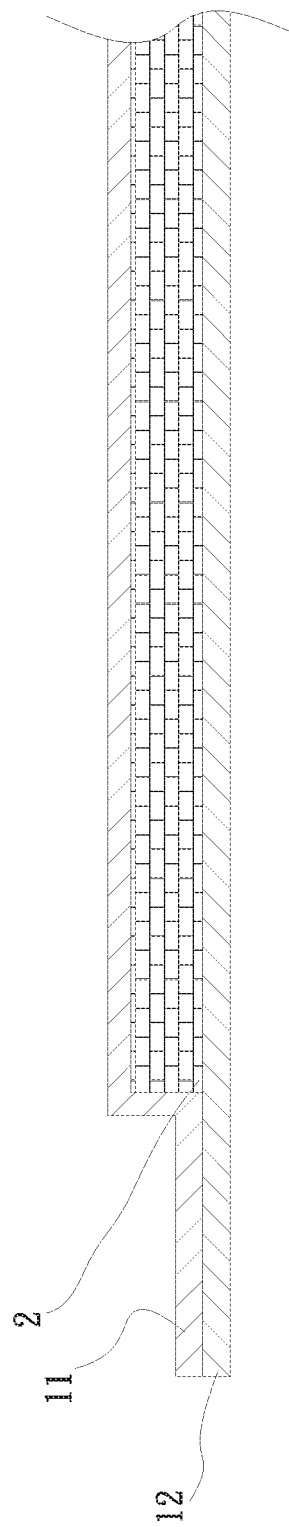
FIG. 8 is a sectional assembled view of a fourth embodiment of the vapor chamber water-filling section sealing structure of the present invention.

Please now refer to FIG. 8, which is a sectional assembled view of a fourth embodiment of the vapor chamber water-filling section sealing structure of the present invention. The fourth embodiment is partially identical to the first embodiment in structure and thus will not be repeatedly described hereinafter. The fourth embodiment is different from the first embodiment in that the capillary structure 2 is an independent component without being previously formed on the first and second plate bodies 11, 12. The capillary structure 2 is directly sandwiched between the first and second plate bodies 11, 12.

Figure 9:
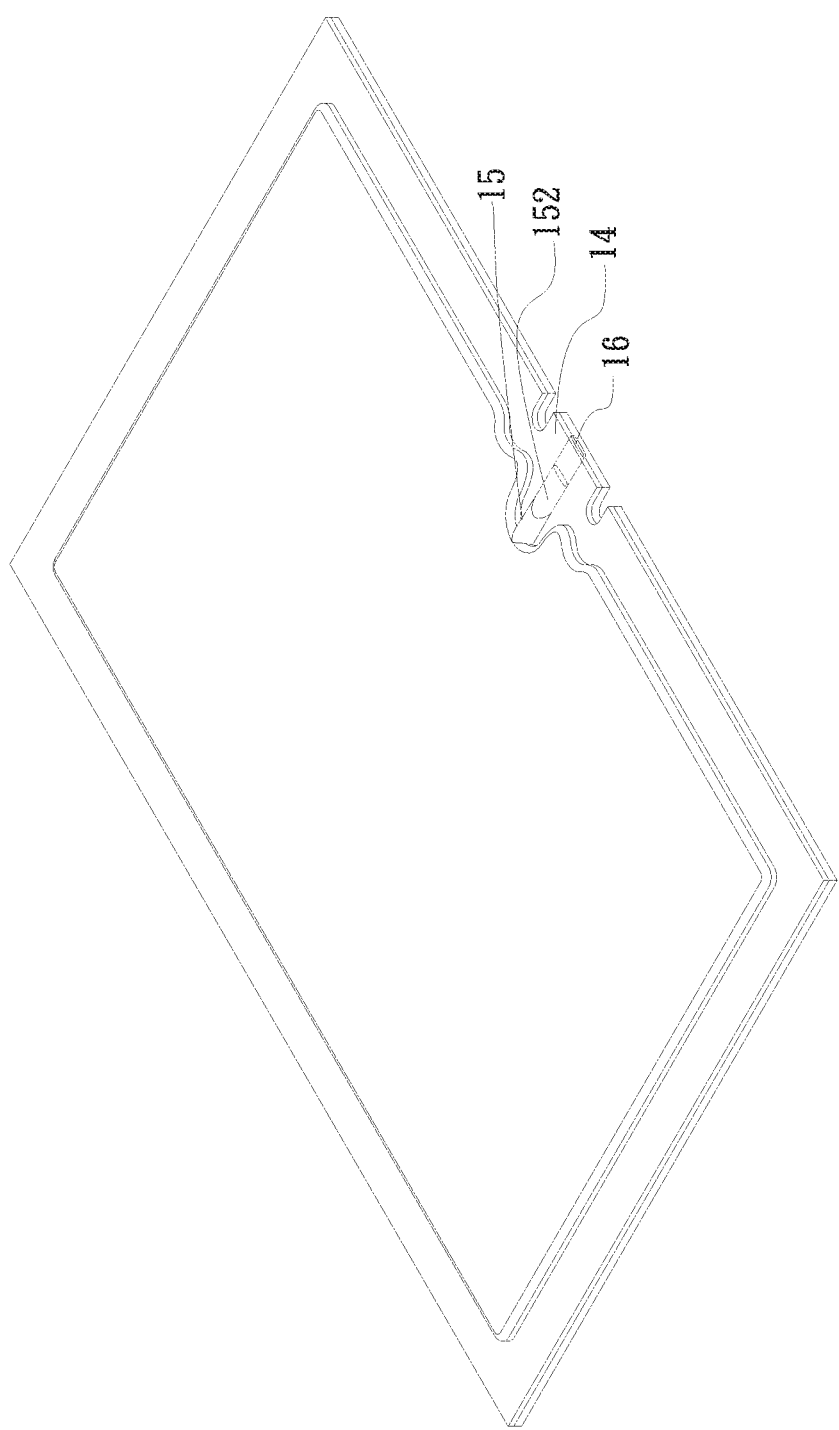
FIG. 9 is a perspective assembled view of a fifth embodiment of the vapor chamber water-filling section sealing structure of the present invention.

Please now refer to FIG. 9, which is a perspective assembled view of a fifth embodiment of the vapor chamber water-filling section sealing structure of the present invention. The fifth embodiment is partially identical to the first embodiment in structure and thus will not be repeatedly described hereinafter. The fifth embodiment is different from the first embodiment in that the main body 1 has a tubular body 16. The tubular body 16 is connected with the water-filling passage 152 of the water-filling section 15 of the main body 1. The tubular body 16 and the portion of the water-filling passage 152 that extends to the flange 14 are together pressed and connected with each other to have a height equal to the height of the flange 14 or lower than the height of the flange 14.

The vapor chamber water-filling section sealing structure of the present invention can eliminate the shortcoming of the conventional vapor chamber that the water-filling section protrudes from the edge of the main body and is apt to be collided and damaged to fail. In addition, the space of the internal airtight chamber can be increased to enhance the heat conduction efficiency. Moreover, the prevent invention provides a wider airtight edge-sealing range for the first and second plate bodies.

In the water-filling operation of the above embodiments of the present invention, the working fluid is mainly a common working fluid applied to the general vapor chamber manufacturing process or structure. The working fluid is not denoted with any reference numeral in the drawings of the respective embodiments.

The present invention has been described with the above embodiments thereof and it is understood that many changes and modifications in such as the form or layout pattern or practicing step of the above embodiments can be carried out without departing from the scope and the spirit of the invention that is intended to be limited only by the appended claims.

What is claimed is:

1. A vapor chamber water-filling section sealing structure comprising:
   a main body having a first plate body and a second plate body correspondingly mated with each other to together define an airtight chamber, a water-filling section, and a flange disposed along an outer periphery of the main body, the water-filling section having a water-filling notch having a continuously curved profile extending inwardly from an edge of the airtight chamber and a water-filling passage, one end of the water-filling passage extending through the flange to terminate at an edge of the flange, an other end of the water-filling passage connecting with the water-filling notch to communicate with the airtight chamber, a portion of the water-filling passage that extends to the flange being pressed to have a height equal to or lower than a height of the flange and
   a capillary structure selectively disposed in the space of the airtight chamber of the main body, wherein the first plate body has a first face and a second face, the second plate body having a third face and a fourth face, a depression and the water-filling section being raised from the first face to the second face of the first plate body, the second plate body being correspondingly mated with the depression to form the airtight chamber, wherein the second face and the fourth face are respectively disposed on upper and lower faces of the main body, the second face being defined as a condensation face, while the fourth face being defined as a heat absorption face, the flange having a first notch and a second notch arranged outwardly of and aligned with the water-filling notch, the first and second plate bodies being made of commercial pure titanium.

2. The vapor chamber water-filling section sealing structure as claimed in claim 1, wherein the capillary structure is disposed on both the first face of the first plate body and the third face of the second plate body.

3. The vapor chamber water-filling section sealing structure as claimed in claim 1, wherein the water-filling notch and the water-filling passage extend in a direction to the flange or the airtight chamber.

4. The vapor chamber water-filling section sealing structure of claim 1, wherein the flange defines first and second notches aligned with the water-filling notch.

* * * * *